M. DAVIS.
CONTROL FOR TIRE STRIPPING MACHINES.
APPLICATION FILED AUG. 31, 1920.

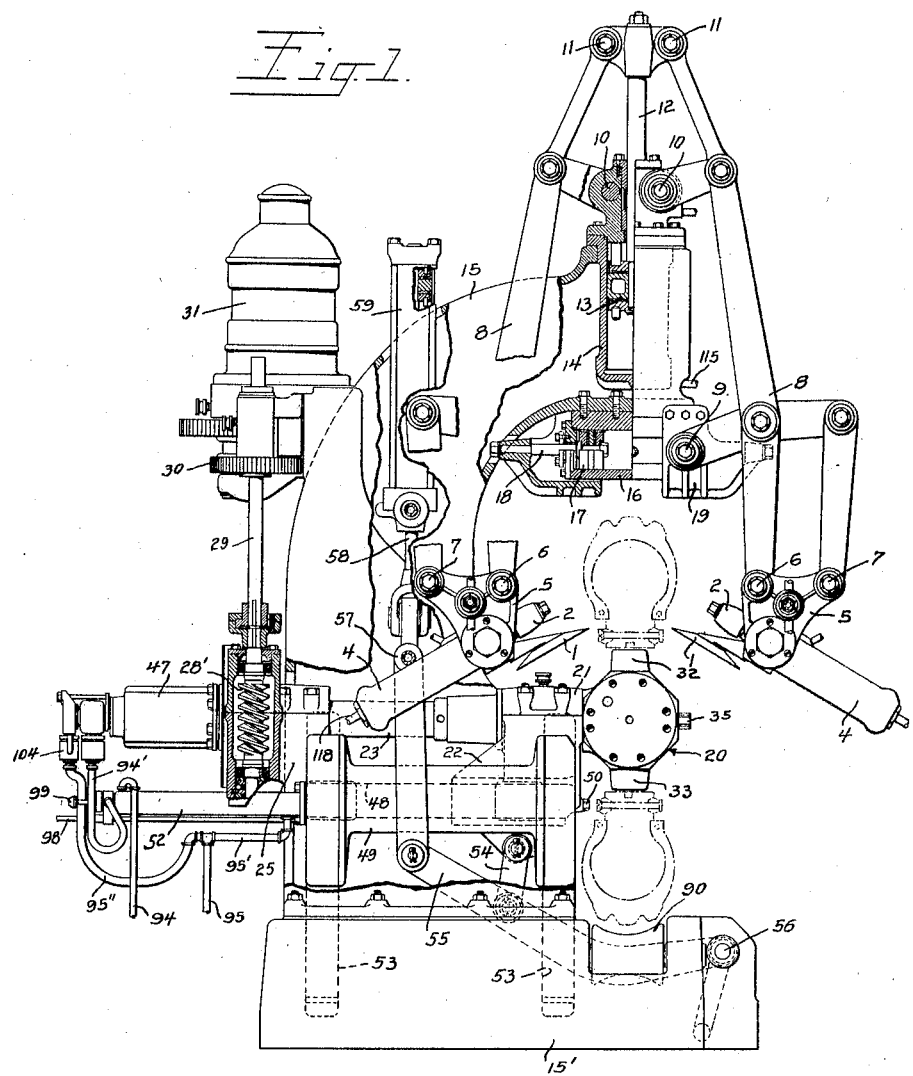

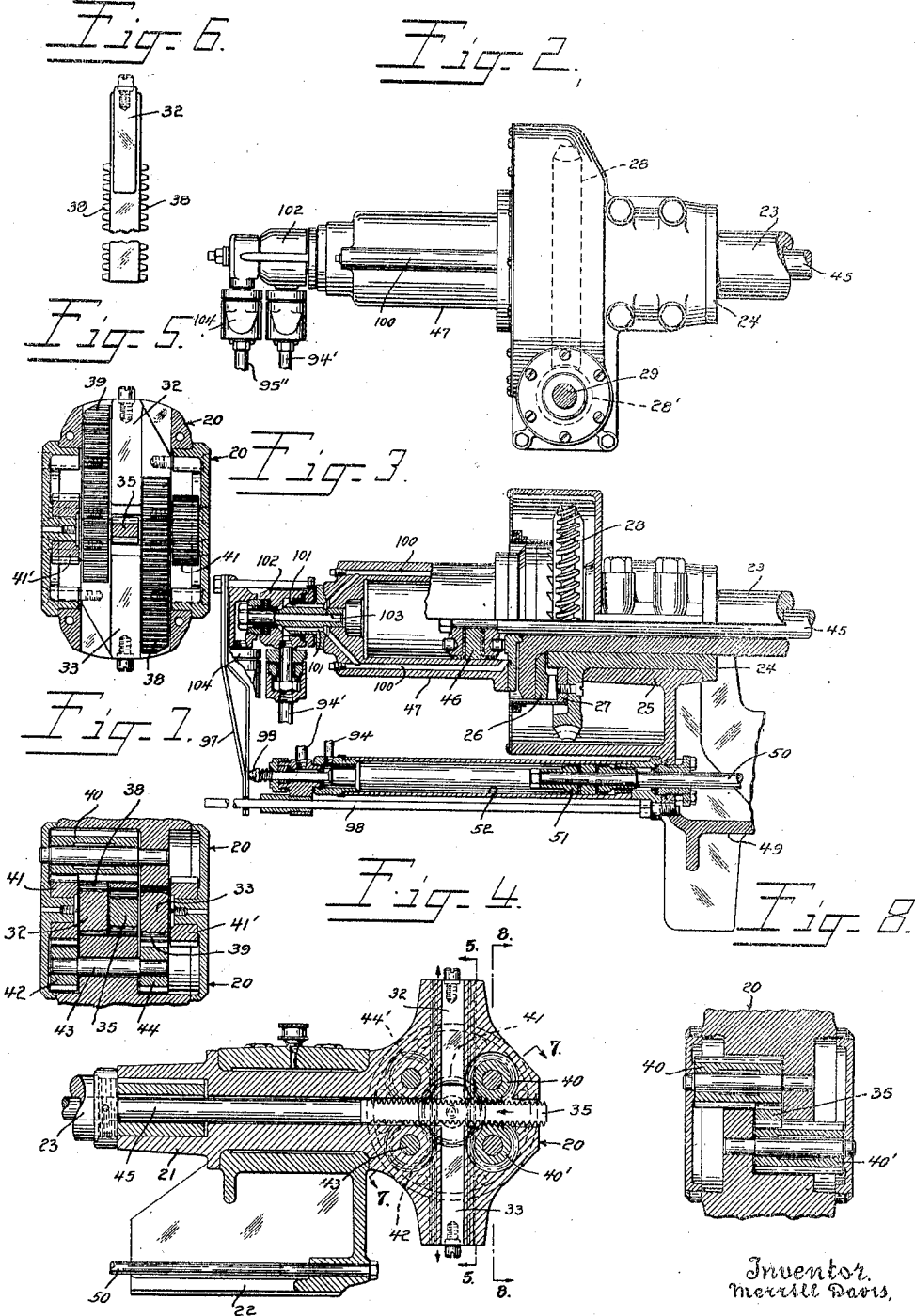

1,384,431.

Patented July 12, 1921.
6 SHEETS—SHEET 3.

Inventor.
Merrill Davis,
By Ernest Hopkinson
his Attorney.

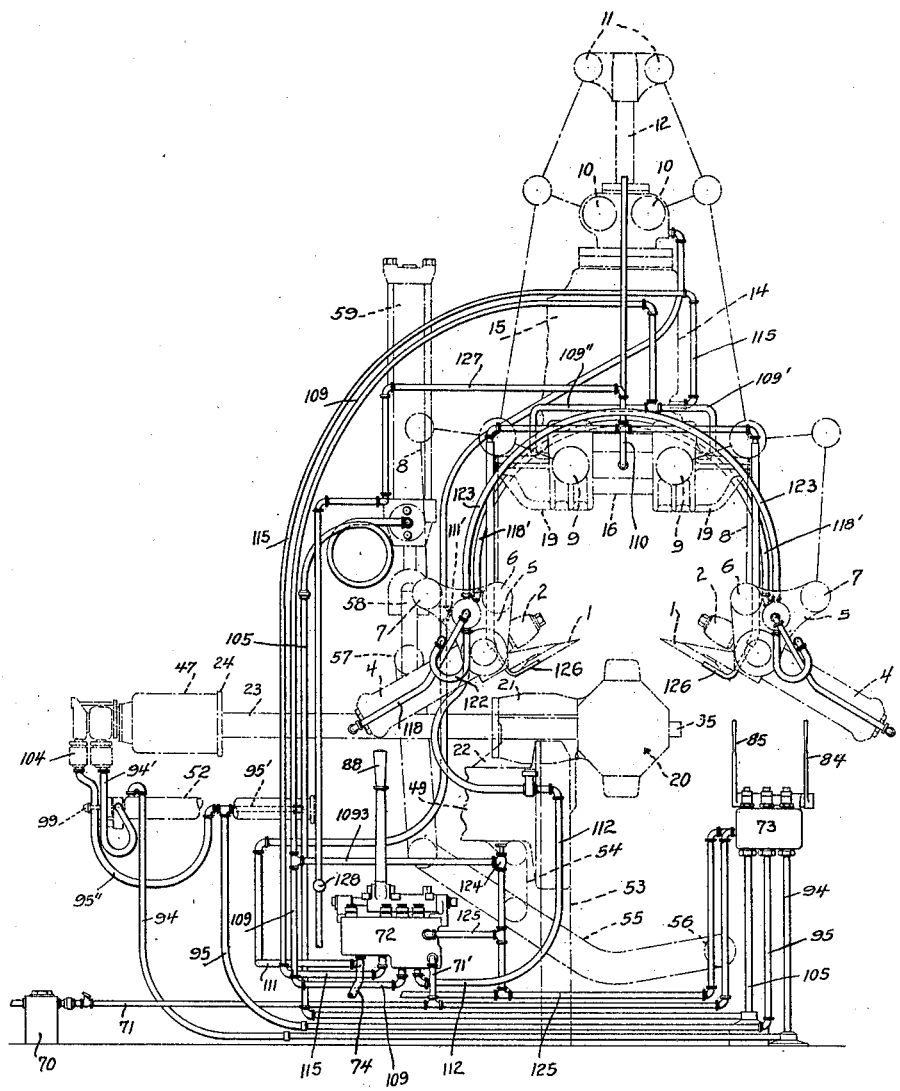

M. DAVIS.
CONTROL FOR TIRE STRIPPING MACHINES.
APPLICATION FILED AUG. 31, 1920.
1,384,431.   Patented July 12, 1921.
6 SHEETS—SHEET 5.
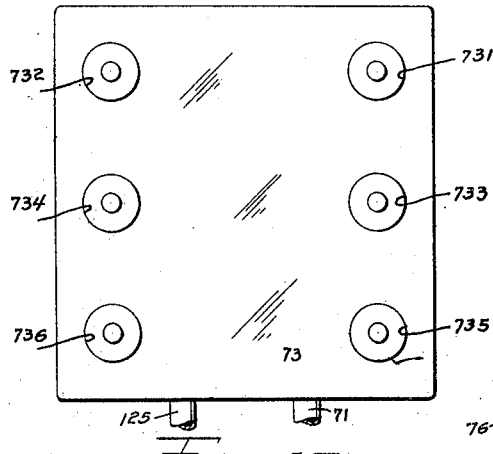
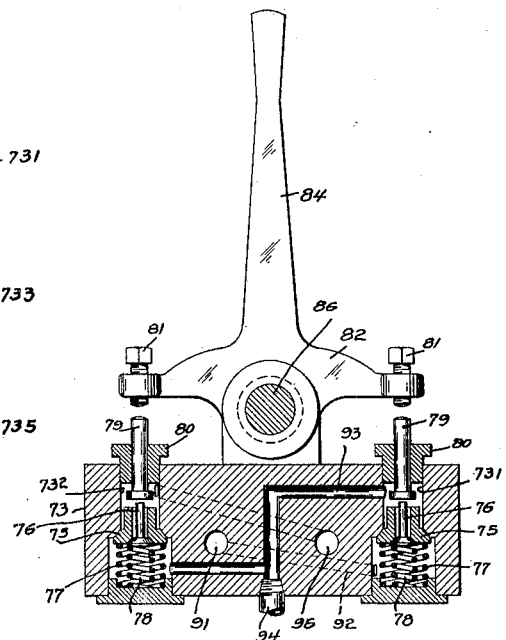
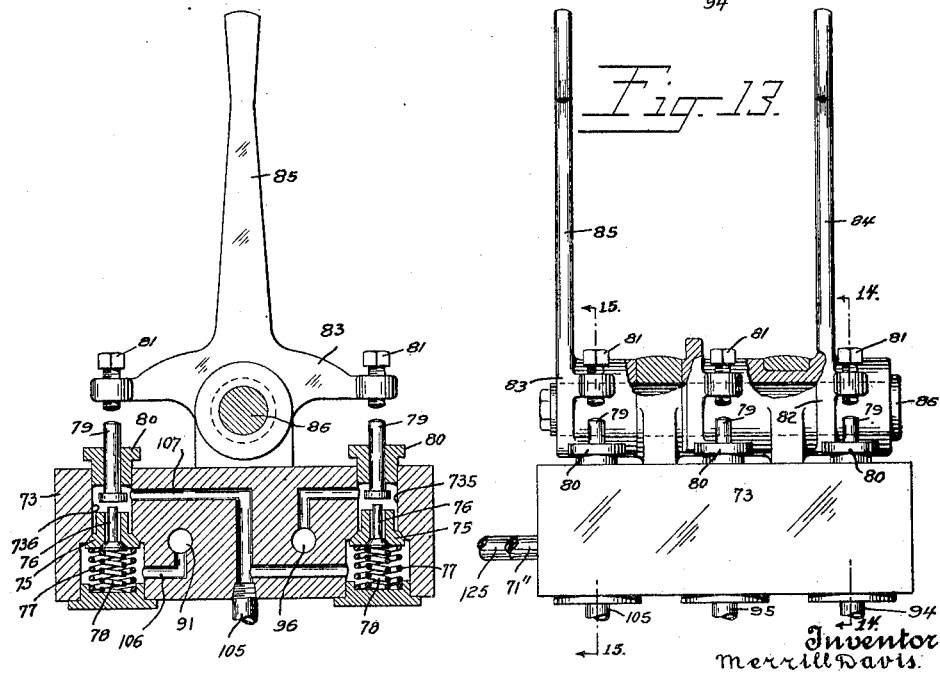
Inventor
Merrill Davis.
By his Attorney
Ernest Hopkins M. DAVIS.
CONTROL FOR TIRE STRIPPING MACHINES.
APPLICATION FILED AUG. 31, 1920.
1,384,431.
Patented July 12, 1921.
6 SHEETS—SHEET 6.
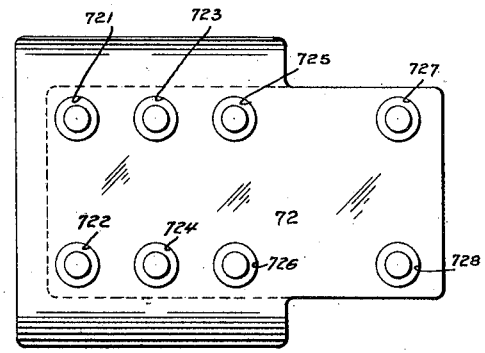
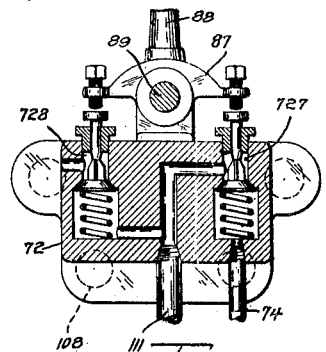
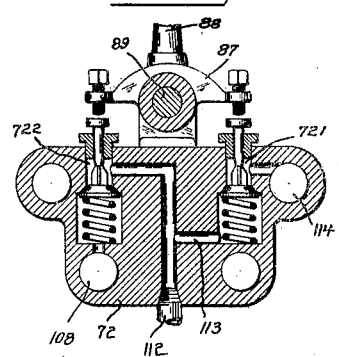
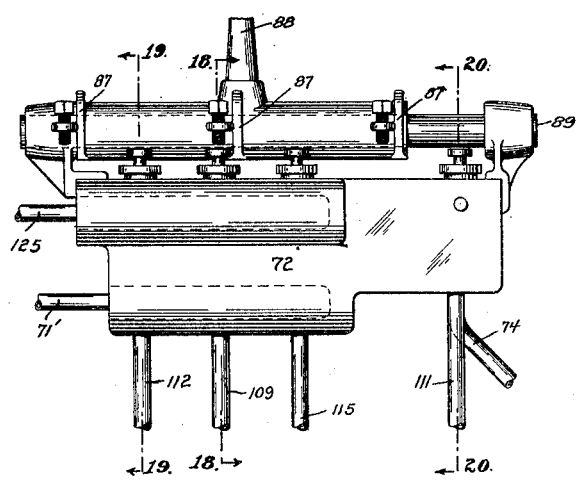
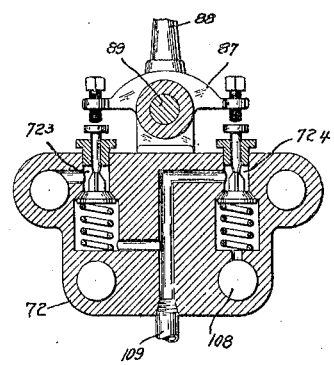
Inventor
Merrill Davis
By his Attorney
Ernest Hopkinson

UNITED STATES PATENT OFFICE.

MERRILL DAVIS, OF DETROIT, MICHIGAN, ASSIGNOR TO MORGAN AND WRIGHT, A CORPORATION OF MICHIGAN.

CONTROL FOR TIRE-STRIPPING MACHINES.

1,384,431. Specification of Letters Patent. Patented July 12, 1921.

Application filed August 31, 1920. Serial No. 407,077.

*To all whom it may concern:*

Be it known that I, MERRILL DAVIS, a citizen of the United States, residing at Detroit, county of Wayne, and State of Michigan, have invented certain new and useful Improvements in Controls for Tire-Stripping Machines, of which the following is a clear, full, and exact description.

This invention relates to a fluid pressure system and particularly to a type thereof suited for governing the operation of a tire stripping machine.

The invention has for an object the equipment of machines of the type disclosed in application of Adrian O. Abbott, Jr., Sr. No. 375,792, filed April 22, 1920, with devices for controlling their operation by fluid pressure and with a nicety commensurate with the relative delicacy of their several sequential movements. Further it aims to provide a combination and arrangement of primary or manual controls that will compel the operator to view the work from advantageous positions but without an objectionable movement about. And still further it aims to provide a construction of valve block which insures against disastrous operation of the machine thereby rendering its destruction fool-proof. And the invention aims also to provide a control for tire stripping machines that the operator may manipulate with equal facility in loosening tires of different sizes, no adjustment of parts being necessary.

An embodiment of the invention is illustrated in the accompanying drawings in which:

Figure 1 is an elevation partly in section of a tire stripping machine;

Fig. 2 represents the general arrangement in plan of a worm gear drive between a motor and chuck;

Fig. 3 represents in vertical section and in quarter section fluid pressure cylinders for operating the chuck arms and for shifting a front bearing for the chuck;

Fig. 4 is a vertical cross-section through the core supporting chuck and its head bearing;

Figure 9:
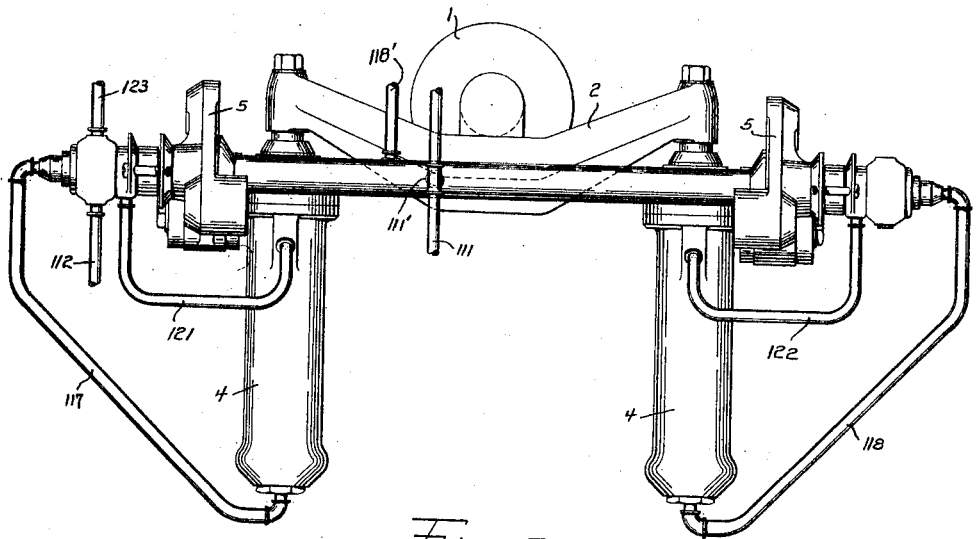
Figures 10, 11:
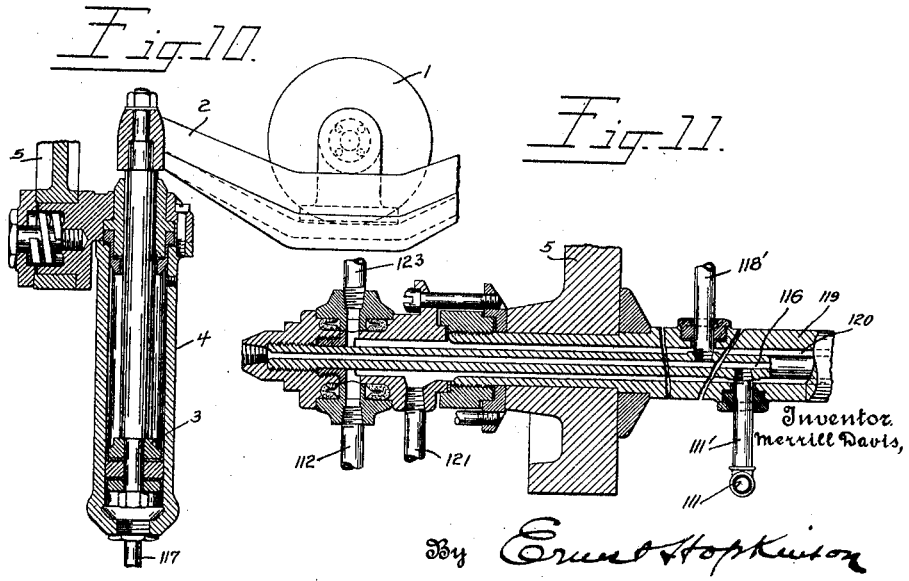

Figs. 5 to 8 inclusive show details of the chuck construction mostly in cross-section on lines indicated in Fig. 4;

Fig. 9 is a view looking down at an angle of about 60° upon the left hand pair of disk cylinders shown in Fig. 1 and shows the supporting construction and arrangement of one of the two duplicate pairs of such mechanism;

Fig. 10 is a detail of a tire loosening disk and one of its pair of supporting and actuating plungers and cylinders;

Fig. 11 illustrates ports and passages for conveying air and water to the disk cylinders;

Fig. 12 is a diagrammatic illustration of a piping system for conveying fluid to and from the several cylinders;

Fig. 13 represents in side elevation a valve block;

Figs. 14 and 15 are sections on the lines 14—14 and 15—15 of Fig. 13;

Fig. 16 is a diagrammatic plan view of the valve block shown in Fig. 13;

Fig. 17 shows in side elevation a second valve block;

Figs. 18, 19 and 20 are sections on the correspondingly numbered lines of Fig. 17;

Fig. 21 is a diagrammatic plan view of the valve block shown in Fig. 17, and

Fig. 22 illustrates a shifted position of an operating handle or lever for this same valve block.

In its broad aspects the invention is not limited to application of any particular type of tire stripping machine, and it will be understood that the tire stripping machine illustrated is only one of the many possible forms thereof with which the control of the present invention may be combined.

In the drawings the tire stripping machine shown is constructed as described in detail in the aforementioned Abbott application. For the purposes of this application the tire stripping machine may be described briefly as follows:

Loosening disks 1 are each rotatably supported at the center of cross bars 2 which are fixed at the opposite ends to plungers 3 in spaced pairs of cylinders 4. The cylinders 4 are each supported by plates 5 that are articulated at 6 and 7 to parallel motion linkages 8 having fulcrums at 9 and 10 and actuating driving connections at 11 with a piston rod 12 which is adapted to be reciprocated by fluid pressure on its piston 13 in a cylinder 14 that is suitably mounted in the head of a C-shaped frame 15 resting on a base 15'.

There are four sets of linkages 8, one for each pair of plates 5, and the several fulcrum pins 9 are adapted to be shifted by fluid pressure in a horizontally arranged and fixed cylinder 16 containing opposed pistons 17 whose rods 18 are fixed to cross-heads 19 slidably supported externally by the cylinder, the fulcrum pins 9 being carried by the cross-heads.

By timely admission of fluid to the proper ends of the cylinders 4, 14 and 16, the disks may be brought up under the beads or toes of a tire casing, swung about their core contacting points as a center to a nearly vertical position, and then forced in what may be roughly described as an outward radial direction between the core and the tire to a loosening position.

To free the tire from the core substantially completely throughout its annular extent, the disks and tire are moved relatively, and preferably by supporting the core and tire on a chuck which may be rotated at opportune times.

The chuck, indicated generally by the numeral 20, has a hub portion 21, see Fig. 4, which is journaled in a shiftable head bearing 22 and which is suitably connected to one end of a tubular shaft 23 extending to the rear of the machine where its opposite end is slidably journaled in a revoluble sleeve or bushing 24, see Fig. 3, that is in turn journaled in a bearing 25 formed integral with a chuck carriage 49. On the rear end of the tubular shaft 23 is formed a clutch part 26 which coöperates with an opposed clutch part 27 on a worm wheel 28 that is fixed or formed integral with the sleeve 24. When the clutch parts are engaged, the worm wheel may be operated and with it, of course, a core on the chuck, by a worm 28' on the lower end of a vertical shaft 29 whose upper end is suitably geared as indicated at 30 to a source of power such as a motor 31.

The chuck, see Figs. 4 and 8, has two diametrically opposed arms 32—33 of the shape illustrated in the drawings and these arms are provided on opposite sides with racks 38 and 39 respectively. Duplicate trains of gears are housed within the chuck so as to drive its arms 32—33 simultaneously outwardly or inwardly. One of these duplicate sets of gears will be described in detail. It comprises a broad pinion 40 having its teeth in engagement at one end with a double faced actuating rack 35, at an intermediate portion with the teeth 38 on one side of the chuck arm 32, and at the other end with an idler 41 which latter drives a pinion 42 at one end of a stub shaft 43 carrying at its opposite end a second pinion 44, which latter meshes with teeth 39 on one side of the other chuck arm 33.

Referring to Fig. 4, when the actuating rack 35 is shifted in the direction indicated by the arrow, broad pinion 40 will be rotated in a clock-wise direction and through the central portion of its teeth, which engage with one of the racks 38, thrust the chuck arm 32 outwardly. At the same time the chuck arm 33 will be thrust outwardly by the gear train 41—42—44 the last named being in operative engagement with one of the racks 39 on opposite surfaces of the lower chuck arm. Through an oppositely located and arranged set of gears indicated by corresponding characters primed, the lower chuck arm 33 is moved directly by a broad pinion 40' and the upper chuck arm 32 is moved indirectly by a narrow pinion 44'. Thus each chuck arm 32—33 may be moved from the actuating rack 35 by pairs of gears engaging teeth on their opposite faces. It will be understood, of course, that the outer end of each chuck arm is shaped to enter sockets on the inner periphery of the core on which the tire has been built up or fabricated and vulcanized.

The actuating rack 35 is, as shown, fashioned on one end of a piston rod 45 telescopically arranged within the tubular shaft 23. By a piston 46 within a cylinder 47 the actuating rack 35 may be shifted in one direction or the other.

For facility in introducing the cores carrying a vulcanized tire and in order to relieve the operator of labor, it is desirable to draw the chuck 20 within the frame of the machine. To this end the front bearing 25 is slidably supported on parallel guide bars 48, Fig. 1, on the opposed inner faces of a carriage 49. To the front bearing 25 is connected one end of a rod 50 whose opposite end is secured to a piston 51, Fig. 3, in a cylinder 52. By the admission of fluid under pressure to the proper end of the cylinder 52 (supported by the carriage 49) the chuck may be moved to or from the normal operating position when desired.

The chuck 20 may be shifted vertically as well as horizontally, it being desirable to capacitate the machine for all sizes of tires. The chuck operating mechanism proper is supported by the carriage 49 and the latter may be shifted vertically along guide bars 53 within the frame of the machine. To raise or lower the carriage 49 it is connected by a link 54 to a lever 55 which is fulcrumed at 56 and at its opposite free end linked as indicated at 57 to the lower end of a piston rod 58 that is adapted to be actuated by fluid admitted under pressure to the cylinder 59.

Any suitable fluid under pressure may be supplied to the several cylinders to effect the various operations of the component parts of the machine but water and air are preferred. These are supplied to the cylinders through a system of piping shown in Fig. 12 of the drawings and the flow of the fluid is governed by manipulation of valves in blocks 72—73 in which the several lines of piping terminate.

Water is supplied to both valve blocks through a filter 70 and pipe 71 having branches 71' 71" leading to the valve blocks. Air is supplied from a compressor (not shown) to the valve block 72 through a pipe 74. The valve blocks are illustrated in detail in the last two sheets of drawings. Valve block 73, shown in Figs. 13 to 16 inclusive, has three pairs of valves numbered 731 to 736 inclusive arranged oppositely along its sides. These valves are constructed as shown in cross-section in Figs. 14 and 15 and each has main and auxiliary portions 75 and 76 with individual springs 77—78 normally holding them closed, the auxiliary portions rendering their opening easy and permitting the flow of fluid controlled thereby to be reduced so as to slow down the final shifting movements of the chuck. For opening the valves, pins 79 slidably mounted in bushings 80 are engaged by screws 81 in lateral arms 82—83 of two hand levers 84—85 which are pivoted on a centrally arranged shaft 86. Lever 84 controls two pairs of valves and lever 85 one and the several arms are arranged to open, one valve of a pair to admit or exhaust fluid through suitable ports or passages provided in the block from a single pipe end or terminal of the system.

Valve block 72 is of the same general construction as valve block 73 but its valves are not provided with the auxiliary portions. There are four pairs of valves numbered 721 to 728 inclusive in the valve block 72 and these valves are so arranged with relation to three pairs of lateral arms 87 carried by the rock lever 88 that is slidably pivoted on a shaft 89 intermediate the rows of valves, that by swinging the rock lever in one direction when positioned as shown in Fig. 14 one valve of a pair may be operated, or, when the lever is positioned as shown in Fig. 19, three valves of three pairs may be simultaneously actuated.

The chuck being positioned within the frame of the machine, and a tire having been trundled into position on the rollers 90, the operation of the machine is controlled in the following manner:

The chuck is advanced to a position within the core supporting a tire and when its arms are substantially in the central plane of the core the chuck is halted and the arms expanded. These two operations are effected automatically in sequence by pushing the hand lever 84, Fig. 14, to the right thereby admitting water from the supply port 91, through passage 92, valve 731, passage 93, and pipe 94, to the front end of the chuck shifting cylinder 52. And simultaneously a second arm 82 on the hand lever 84 opens the adjacent valve 733 to exhaust water from the back end of the cylinder 52 through the branch 95' of the pipe 95 which is in communication with the exhaust port 96 by a set of passages similar to those appearing at the right center of Fig. 15. The piston 51 is thus hydraulically advanced and with it the front bearing 22. Chuck 20 and its associated mechanism is also advanced with the front bearing until the clutch parts 26 and 27 engage which happens when the chuck arms 32 and 33 are substantially in line with sockets in the inner periphery of the core or just before the clutch parts 26 and 27 engage, the lower end of a tappet arm 97, which is fixed and movable with the cylinder 47 and which is guided by the rod 98, opens a valve 99 in the free end of the cylinder 52 to allow water to escape from the front end thereof through a connection 94' to the rear end of cylinder 47, communication thereto being afforded by the passages 100 and 101 of a swiveled fitting 102 that permits rotation of the cylinder 47 relative thereto without leakage.

The front end of cylinder 47 is in communication with the pipe 95 (at this time open to the waste line 125), through the tubular pin 103, port 104 and branch 95", and consequently entrance of water to the rear of the piston 46 will move the rack 35 in the direction of the arrow Fig. 4 and thereby expand both chuck arms 32—33 outwardly to their place within sockets in the core. Thus by one movement of the hand lever 84 the chuck is advanced and its arms expanded in successive or sequential operation. Upon return of the handle to its upright or neutral position the valves controlled by it are relieved and close the passages so as to seal water in the cylinders and hold the parts in the position to which they have been brought.

The tire is then raised to a position to move its beads substantially into horizontal alinement with the edges of the loosening disks 1. This is effected by rocking the hand lever 85 see Fig. 15, to open valve 736 and admit water through the passages 106 and 107 and piping 105 to the lower end of the hoisting cylinder 59. When the desired elevated position is reached, the hand lever 85 is returned to upright or neutral position to seal the water in the lower end of the cylinder.

Then the tire loosening disks 1, which are normally separated a greater distance than the width of the tire are brought together until they contact with the core just beneath the beads. Assuming the rock lever 88 in the position shown in Fig. 17, this is done by swinging it to engage valve 724 to establsh communication between the supply port 108 and the piping 109 having branches 109' and 109" to the opposite ends of the spreader cylinder 16. The opposed front sides of the pistons 17 in the cylinder 16 are constantly under the pressure of air from a suitable source supplied thereto through the pipe 110. The water pressure supplied to the outside ends of the cylinders being in excess of that of the air, the pistons move inwardly and carry the disks 1 to a contacting position with the core beneath the beads of the tire, it being remembered that the fulcrum pins 9 of the linkages 8 are supported by cross heads 19 which are connected to the pistons 17. Upon return of the rock lever 88 to an upright neutral position the disks will be secured or maintained in position.

The parts of the machine are now ready to perform the loosening operations proper. The rock lever 88 is shifted axially on its supporting shaft 89 from the position shown in Fig. 17 to that shown in Fig. 22. It is then swung to engage three of the three pairs of valves its lateral arms control. One of these valves, 727, admits air to the pipe 111 and branch 111' to the front ends of the four disk cylinders and also to the rear end or top of the linkage cylinder 14. The connections between the branch 111 and the front ends of the disk cylinders 4 will be passed for the moment. A second valve, 721, allows water in the front end of the disk cylinders 4 to pass out through the pipe 112 and ports 113 through the waste or exhaust port 114. The connections between the pipe 112 and the back end of the disk cylinders will be described later in detail. The third valve, 725, exhausts water from the lower end of the linkage cylinder 14 through piping 115, its controlling valve and passages being similar to those previously described in connection with Fig. 19.

The air line 111 and branch 111' are connected to a hollow tube 116, see Figs. 9 and 11, which at its opposite ends through tubing 117 and 118 communicates with the free ends of two of the disk cylinders 4. And air is led from the hollow tubing 116 through a cross connection 118' which at its other end is similarly connected to the oppositely disposed pair of disk cylinders 4.

Water is conveyed to one of the two pairs of disk cylinders through the pipe 112 which communicates with a space between the tube 116 and a slightly larger tube 119. The space or passage 120 between these tubes serves as a port or passage for water which is led therefrom through connections 121 and 122 to the back ends of the cylinders 4. And from the space 120 a branch connection 123 conveys water through similar connections at its other end to a pair of cylinders disposed on the opposite side of the tire.

By the admission of air to one side of the pistons in the several disk cylinders 4 and in the linkage cylinder 14 simultaneously with the venting of water from the opposite sides of the same pistons, the disks are first swung about their core-contacting-points as a center from a nearly horizontal to a nearly vertical position. And owing to the elastic force of the air under pressure behind the pistons of the disk cylinder, the disks 1, when the nearly vertical position is reached, gradually work their way up between the tire and the core. To this upward movement the shoulder or swell on the core offers an obstruction and it is sometimes desirable to keep the disks from blunting themselves against it. To this end a hand valve 124 is located in a branch 1093 connecting the hydraulic line 109 with the waste line 125 being in effect a shunt connection around the valve block 72. By opening this hand valve 124 the water pressure to the outside ends of the spreader cylinder 16 may be relieved so as to allow the constant air pressure between the piston 17 to spread the disks 1 apart to the extent desired. Thus blunting of the edges of the disk may be avoided and also the tire loosened from the core for some little distance in advance of the edges of the disks whereupon they quickly move to a full loosening position adjacent the center line of the tread. The hand valve 124 is, of course, shut off before the spreading of the disks becomes excessive. This valve 124 and its connection may be omitted, however, if desired.

When the disks have arrived at a full loosening position as described, the core is then rotated by operation of a motor 31 which may be governed by a conveniently disposed push button.

After the tire has been completely loosened circumferentially, the operations above described are repeated in the reverse order, the various hand levers being rocked in the opposite directions.

During rotation of the core to loosen the tire circumferentially therefrom it is desirable to spray soapy water on the disks 1. This may be done in any convenient manner as through the nozzles 126 supplied through branches from the piping 127 from a suitably elevated reservoir or pump, a hand valve may be provided at 128 to govern the flow. But soapy water may be sprayed upon the disks automatically in any suitable manner as by a trip controlled air valve governing the source of supply to eject the fluid when the linkages reach their lowermost positions, the last operation preceding rotation of the core.

From the foregoing description it will thus be seen that I have provided a control for a fluid operating machine which is simple to operate. The valve operating mechanism is so arranged that the machine is practically fool-proof against destruction, conflicting operation of its parts being excluded. The valve blocks are so located that the operator, in governing the movements of the chuck, must stand in a position where he cannot fail to note the relation of the edges or beads of the tire and the disks. At the conclusion of the chuck manipulation, the operator moves from block 73 to block 72 which governs the movement of the disks. Here he is in a position, roughly speaking, in the plane of the core where the progress of the loosening operation is best observed. In any of the several operations, should difficulty be encountered, the operator may immediately halt the operations by swinging the proper lever to a neutral position and remedy the trouble.

Having thus described my invention what I claim and desire to protect by Letters Patent is:

1. A tire loosening machine having a core support and loosening member one of which at least is revoluble, and mechanism operatively supporting the same, in combination with a fluid pressure system including valve blocks each containing a plurality of valves, and means for actuating the valves to progressively govern the extent of the several operations of the machine which are controlled thereby.

2. A tire loosening machine having a core support members for loosening a tire from a core, and means for operatively supporting the core and members, in combination with a fluid pressure system including a plurality of valves and selective means for actuating said valves in groups to perform the loosening operations manually in a desired sequence and to an extent suited to the size tire on the core.

3. A tire loosening machine having a rotatable core support, tire loosening members, means supporting the members so as to permit their introduction between a core and the sides of a tire thereon, and fluid pressure operable devices for moving the members, in combination with a fluid pressure system including sources of fluid supply, conduits to said devices, valves governing the passage of fluid in said conduits, and manually operable levers one of which at least is shiftable to engage different groups of valves.

4. A tire loosening machine having a rotatable core support, tire loosening members, means supporting the members so as to permit their introduction between a core and the sides of a tire thereon, and fluid pressure operable devices for moving the members, in combination with a fluid pressure system including sources of fluid supply, conduits to said devices, valves governing the passage of fluid in said conduits, said valves being located in groups spaced from the machine and each other for advantageous observation of the operations controlled thereby, and manual means for actuating said valves.

5. A tire loosening machine having a rotatable core support, tire loosening members, means supporting the members so as to permit their introduction between a core and the sides of a tire thereon, and fluid pressure operable devices for moving the members, in combination with a fluid pressure system including sources of fluid supply, conduits to said devices, valves governing the passage of fluid in said conduits, said valves being located in two spaced groups in front and to one side of the machine.

6. In a tire loosening machine, a movable core supporting chuck, tire loosening members, means for shifting the members laterally of the core, means for introducing the members between a core and a tire thereon, means for governing the operation of the machine including devices permitting the members to be spread apart independently of the core and during their introduction past its undercut portion, and means for rotating the chuck to loosen the sides of the tire circumferentially.

7. A tire loosening machine having a core support, tire loosening members, and mechanism for supporting and actuating the same to loosen a tire from a core, in combination with a fluid pressure system including valves some of which are provided with auxiliary valves permitting of exact control of certain operations.

8. A tire loosening machine having a core support, tire loosening members, and mechanism for supporting and actuating the same to loosen a tire from a core, in combination with a fluid pressure system including blocks containing a plurality of valves, and rock levers for actuating said valves one of which levers is shiftable and provided with a plurality of lateral arms less in number than the valves in its block for permitting independent actuation only of a plurality of groups of valves governing necessarily distinct operations of the machine.

9. In a fluid pressure system for tire loosening machines, a valve block having a plurality of spring valves mounted therein, and a plural armed rock lever for actuating one of each pair of valves, said rock lever being shiftable to permit selection of the valve or valves to be actuated.

10. In a fluid pressure system for tire loosening machines, a valve block having a plurality of pairs of valves arranged at opposite sides therein, each of said valves having main and auxiliary spring actuated members, and rock levers with lateral arms for actuating the members of each valve in sequence.

Signed at Detroit, Mich., this 12th day of August, 1920.

MERRILL DAVIS.